Figure 1:
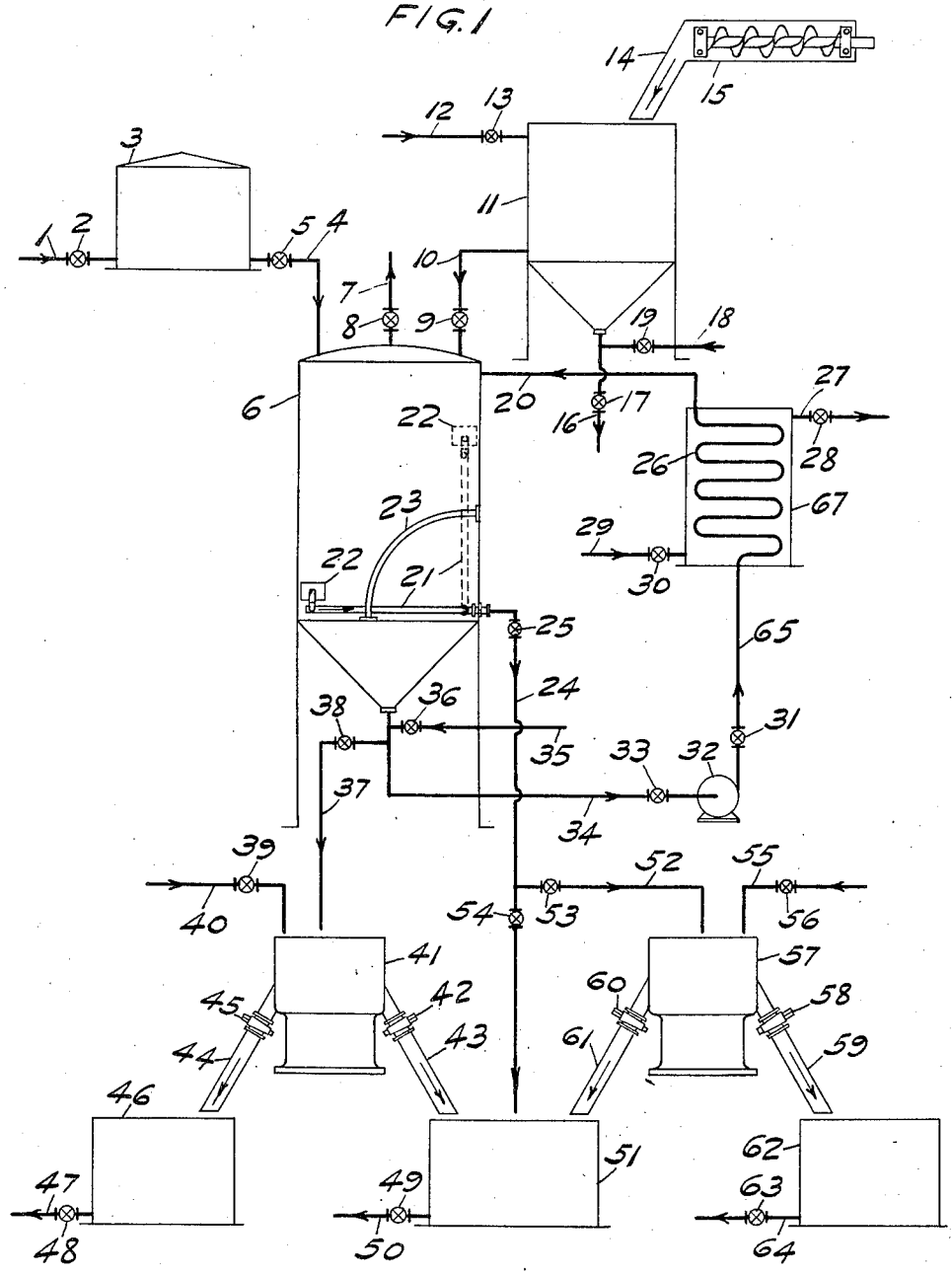

Dec. 13, 1932.　　　A. LACHMAN　　　1,890,516

PROCESS FOR TREATING GASOLINE STOCK

Filed Oct. 6, 1930　　2 Sheets-Sheet 1

INVENTOR
ARTHUR LACHMAN
BY
M. L. Chappell
ATTORNEY

Dec. 13, 1932.  A. LACHMAN  1,890,516
PROCESS FOR TREATING GASOLINE STOCK
Filed Oct. 6, 1930  2 Sheets-Sheet 2

INVENTOR
ARTHUR LACHMAN
BY
M. L. Chappell
ATTORNEY

Patented Dec. 13, 1932

1,890,516

UNITED STATES PATENT OFFICE

ARTHUR LACHMAN, OF BERKELEY, CALIFORNIA, ASSIGNOR TO RICHFIELD OIL COMPANY OF CALIFORNIA, OF LOS ANGELES, CALIFORNIA, A CORPORATION OF DELAWARE

PROCESS FOR TREATING GASOLINE STOCK

Application filed October 6, 1930. Serial No. 486,815.

This invention relates to a method of processing hydrocarbons to purify and render the hydrocarbons "sweet" to the "doctor test", and while not necessarily confined thereto, it more specifically refers to the treatment of motor fuel or gasoline stocks produced by thermo molecular decomposition of hydrocarbons, such as petroleum oils, shale oils, or distillates of these oils, in which mercaptans may be present or formed during a distillation or thermo cracking operation of hydrocarbons containing sulphur compounds.

Briefly stated, my invention comprises commingling hydrocarbons containing in solution corrosive sulphur compounds, such as mercaptans and the like, with a water solution of a caustic alkali containing a comminuted suspended catalyzer of the activated carbon group, such as bone char, charcoal made from cocoanut shells or other nut shells, fruit pits, hard coal, wood, etc., in the presence of oxygen or an aeriform fluid containing oxygen, at any convenient temperature, although ordinary atmospheric temperature is usually satisfactory, and then separating the treated hydrocarbons from the treating reagents. By this oxidizing treatment of hydrocarbons in the presence of caustic alkali containing activated charcoal and oxygen, or an oxygen-bearing gas, a mild oxidation is effected sufficient to rapidly oxidize the mercaptans or any other like sulphur compounds into the corresponding non-corrosive disulphides.

This invention for sweetening hydrocarbons may be operated either in batch lots or by continuous flow treatment operations, preferably below the boiling temperature of the hydrocarbons. The strength of the alkali solution employed may vary within wide limits, a strength from five percent to forty percent NaOH by weight has been used, and the volume from five to fifty percent of the volume of the hydrocarbons. The volume of air employed may be fifty percent of the volume of hydrocarbons, or more, this quantity depending upon the percentage of mercaptans and other sulphur compounds to be converted into non-corrosive bodies. The process may be carried out in batch lots by agitating the caustic solution and the activated carbon separately with air, then adding gasoline without further addition of air; or the process may be carried out continuously by agitating a caustic solution containing active carbon in suspension, and passing a stream of hydrocarbons commingled with air through the treating solution. The activated carbon acts as a catalyzing agent for this oxidation of mercaptans by oxygen gas, and may be employed over a considerable period of time without renewal. For example, one part of active charcoal was agitated with 100 parts of hydrocarbons containing 0.035 percent mercaptan sulphur, and with 25 parts of caustic soda solution (8 percent by weight), in a vessel containing sufficient air for ten minutes. The gasoline was sweet. It was poured off and fresh "sour" gasoline added ten successive times with the same result. The caustic solution with its suspended carbon was then steamed a short time, and agitation with more "sour" gasoline for ten times gave "sweet" gasoline products in each case.

In continuous operation, there was passed through a treater one volume of 8 percent caustic solution containing 3 percent of activated carbon (by weight) in suspension, 5 times the volume of "sour" gasoline, with 3 volumes of air. The rate of passage through the treater was 8 minutes per unit volume. All of the treated gasoline was "sweet" to the "doctor test".

After the activated charcoal has become completely spent it may be revivified by methods known in the art, such as steaming, roasting, or by the use of solvents such as acetone, methyl alcohol and the like, and used again.

With the foregoing preliminary explanation, the preferred embodiment of my invention may be more clearly understood by reference to the accompanying drawings, which show diagrammatical forms of apparatus by means of which the process may be practised either in batch lots or continuously. The process is described as being practiced on gasoline stock with activated charcoal and a water solution of caustic soda as the treating solution, but it is obvious that the process may be used for "sweetening" any hydrocarbon oil, and that the treating fluid may consist of any form of activated carbon suspended or mixed with any of the other caustic alkalies, such as potassium hydroxide or lime. Sodium carbonate, sodium phosphate, borax and other alkaline salts may be used if their pH is substantially greater than 7.4.

The drawings represent generally diagrammatical views of apparatus in which the parts are mainly in vertical section.

Figure 2:
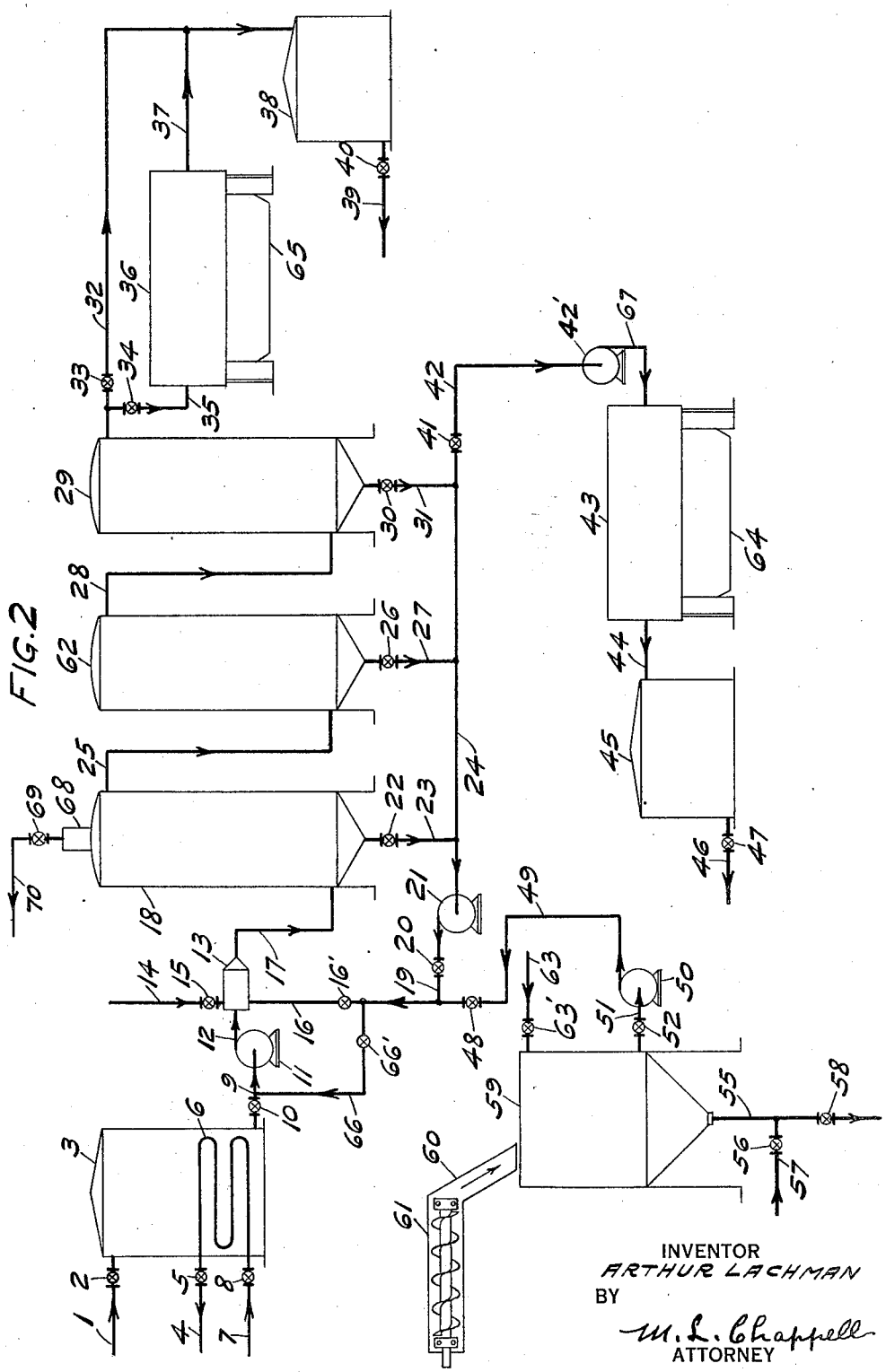

Figure 1 represents an apparatus preferably used when operating in batch lots. Figure 2 represents an apparatus preferably used when operating by a continuous system.

In Figure 1, 3 represents generally a tank for holding the gasoline stock to be treated, which is filled to any desired level by operation of valve 2 in pipe 1. Pipe 1 leads to a source of gasoline stock which is "sour" to the "doctor test".

6 is a treating tank provided with a cone shaped bottom and a swing pipe 21. The dotted lines represent swing pipe 21 in a vertical position. Swing pipe 21 is provided with a flexible joint and a float 22. The weight of float 22 is adjusted so that it will maintain the open end of swing pipe 21 at a level just below the level of the gasoline stock contained in treating tank 6 after the treating and settling operation. 23 is a guide for swing pipe 21. The lowering and raising of swing pipe 21 may be also operated by any other mechanical means, such as a chain and wheel attachment well known in the art.

11 is a tank for mixing and holding the treating reagent, which preferably consists of a water solution of caustic soda containing in suspension comminuted activated charcoal. In making the treating reagent tank 11 is filled to any desired level with a water solution of caustic soda by operation of valve 13 in pipe 12. Pipe 12 leads to a source of a water solution of caustic soda not shown. The strength of the water solution of caustic soda is preferably 8 to 10 percent by weight NaOH, although a stronger or weaker solution may be employed.

After tank 11 has been filled with the water solution of caustic soda, comminuted activated charcoal is introduced into tank 11 through pipe 14 by operating conveyor 15, which leads to a supply of activated charcoal not shown. The quantity of activated charcoal introduced into the caustic soda solution may range from approximately 1 to 8 percent by weight, although smaller or larger amounts may be used, this quantity depending upon the stock to be treated and the product desired.

After the introduction of the activated charcoal into tank 11 in the quantity required, valve 19 in pipe 18 is opened to a regulated degree to admit a flow of air sufficient to agitate and thoroughly commingle the caustic soda solution and activated charcoal. After a substantially uniform mixture of the caustic soda solution and activated charcoal has been obtained valve 19 is closed. Tank 11 is provided with outlet pipe 16 controlled by valve 17, by means of which tank 11 may be emptied to clean or for repairs.

In carrying out the treatment of gasoline stock to be "sweetened", tank 6 is filled to any desired level by opening valve 5 in pipe 4. Pipe 4 connects the untreated gasoline stock in tank 3 to treating tank 6. After treating tank 6 has been filled to the desired level with the gasoline stock to be processed, valve 5 is closed and valve 9 in pipe 10 is opened, which permits the mixture of caustic soda solution containing the suspended activated charcoal to flow into treating tank 6. As soon as the required quantity of the commingled mixture of caustic soda solution and activated charcoal has been introduced into treating tank 6, valve 9 is closed. The quantity of the mixed caustic soda solution and activated charcoal generally ranges from approximately 10 to 30 percent by volume of the gasoline stock to be "sweetened", this quantity depending upon the percent of mercaptans or other like sulphur compounds contained in the gasoline stock.

The gasoline stock in treating tank 6 is commingled with the treating reagent by a circulating agitation, which is carried out by opening valves 33 and 31 in pipes 34 and 65, and then operating pump 32. Pump 32 circulates the treating reagent from the bottom of treating tank 6 through pipe 34, pipe 65, pipe coil 26 and back into treating tank 6.

Pipe coil 26 is enclosed in a container 67, by means of which the treating reagent and the gasoline stock under treatment may be maintained at any desired temperature during the treating operation by passing a heating or cooling fluid through container 67. Pipe 29, controlled by valve 30, leads to a source of heating or cooling fluid not shown, and pipe 27, controlled by valve 28, conducts the heating or cooling fluid to a source not shown.

During the circulating agitation treatment of the gasoline stock air may be introduced into the circulating system through pipe 35 controlled by valve 36. Pipe 35 leads to a source of air not shown. Treating tank 6 is provided with a vapor or air outlet pipe 7, controlled by valve 8. Pipe 7 leads to an absorber not shown, whereby any vaporized gasoline stock may be collected and separated from the air. However, the introduction of air may generally be unnecessary if the treating reagent has been blown with air for a sufficient period of time.

When a sample of the gasoline stock in treating tank 6 shows a negative reaction with "doctor solution", or is "sweet" to the "doctor test", circulation is discontinued by stopping pump 32 and closing valves 33 and 31.

After this circulating agitation treatment has been completed, the commingled gasoline stock and reagent is permitted to rest in quiet until the major portion of the gasoline separates and forms a substantially clear layer above the reagent, after which the gasoline stock which is clear and free from the reagent is drawn into tank 51, passing through swing pipe 21 and pipe 24, the flow being controlled by valves 25 and 54.

When all the clear gasoline has been withdrawn from treating tank 6 into tank 51, valve 54 is closed and valve 53 is opened, which permits the remainder of the gasoline stock containing suspended treating reagent to pass through pipe 52 and into centrifuge 57, wherein the treating reagent is completely separated from the treated gasoline stock, the treating reagent passing out of centrifuge 57 through pipe 59 and into tank 62. From tank 62 the treating reagent may be returned to the treating tank for reuse, or to a recovery plant not shown, by pipe 64 controlled by valve 63. The treated gasoline separated from the reagent passes from centrifuge 57 through pipe 61 and into tank 51. Centrifuge 57 is provided with a water inlet pipe 55 controlled by valve 56, by means of which the centrifuge may be cleaned when necessary.

In case the reagent employed in treating tank 6 to "sweeten" a petroleum oil product forms an emulsion or does not settle in a reasonable length of time, the commingled mixture of petroleum oil product and reagent is immediately discharged in stream flow through pipe 37 by opening valve 38. From pipe 37 the treated petroleum oil product and reagent passes through centrifuge 41, wherein the treated petroleum oil product is separated from the reagent, and passes out of centrifuge 41 through pipe 43 and into receiving tank 51. The separated reagent passes from centrifuge 41 through pipe 44 into receiving tank 46. The separated treating reagent in tank 46 may be returned to treating tank 6 and used again to treat petroleum oil products, or may be conducted to a recovery plant not shown through pipe 47 controlled by valve 48. The treating reagent in general may be used a number of times for "sweetening" ordinary gasoline stock without revivification.

Centrifuge 41 is provided with a water inlet pipe 40, controlled by valve 39, for clearing centrifuge 41 when necessary.

In carrying out this batch process for treating gasoline stock the reagent may be ordinarily re-used for "sweetening" a number of batches, as previously stated, before the reagent is spent, and the major portion of the reagent may be ordinarily left in treating tank 6 until spent by drawing off the treated gasoline stock after settling at the top by swing pipe 21.

The treated gasoline stock which collects in tank 51 is water white and "sweet" to the "doctor test". This finished gasoline stock is conducted to storage not shown through pipe 50 controlled by valve 49.

In Figure 2, 3 is a storage tank for holding the gasoline stock to be processed which may be maintained at any level by operation of valve 2 in pipe 1. Pipe 1 leads to a source of gasoline stock or other petroleum oil stock distillate to be "sweetened". 6 is a heating or cooling coil stationed in tank 3, and connected to pipe 7, controlled by valve 8, which leads to a source of heating or cooling fluid not shown, by means of which the gasoline stock to be processed may be maintained at any required temperature. Pipe 4, controlled by valve 5, is connected to heating or cooling coil 6 and conducts the heating or cooling fluid to a source not shown.

59 is a tank for mixing and holding the treating reagent which, as previously stated, preferably consists of a water solution of caustic soda containing suspended comminuted activated charcoal. In making the treating reagent tank 59 is filled to a predetermined level with a water solution of a caustic alkali, having a pH value greater than 7.4, by operation of valve 63' in pipe 63, pipe 63 leading to a source of the caustic alkali solution not shown. After tank 59 has been filled with the caustic alkali solution, comminuted activated charcoal is introduced into tank 59 through pipe 60 by operating conveyor 61. Conveyor 61 leads to a source of supply of activated charcoal not shown. As previously stated, the quantity of activated charcoal introduced into the caustic alkali solution may range from approximately 1 to 8 percent by weight. After the introduction of the activated charcoal into tank 59, valve 56 in pipe 57 is opened to admit a flow of air sufficient to agitate and thoroughly commingle the caustic alkali solution and activated charcoal. After a uniform mixture of the activated charcoal and caustic alkali solution has been obtained, valve 56 is closed. Tank 59 is provided with an outlet pipe 55, controlled by valve 58, by means of which tank 59 may be emptied to clean or for repairs.

In carrying out the preferred treatment of gasoline stock to be "sweetened", "sour" gasoline stock from tank 3 is caused to flow through pipe 9 and into the suction side of pump 11 by a regulated opening of valve 10. At the same time valve 52 in pipe 51 is opened to a regulated degree sufficient to admit a stream flow of the required amount of the treating reagent to pass into the suction side of pump 50. Pump 50 discharges the reagent through pipe 49, valve 48, then through pipe 66 and into pipe 9, when valves 48 and 66' are open and valve 16' is closed; or pump 50 may discharge the reagent through pipe 49, valve 48, pipe 16 and into mixing chamber 13 by opening valve 16' and closing valve 66'. Preferably the reagent is discharged into pipe 9 where it mixes with the gasoline stock and is thoroughly commingled upon passing through pump 11 and mixing chamber 13. Pump 11 discharges the gasoline stock, or gasoline stock and reagent, through pipe 12 and into mixing chamber 13, or as previously stated the reagent may be introduced directly into mixing chamber 13 without passing through pump 11.

Pipe 14, controlled by valve 15, is connected to mixing chamber 13 and leads to a source of compressed air not shown, by means of which the required amount of air is continuously introduced into mixing chamber 13, and commingled therein with the gasoline stock and reagent. The quantity of air usually required to oxidize and convert all the mercaptans into the corresponding disulphides and other like sulphur hydrocarbon oils is approximately 33⅓ percent of the volume of gasoline stock and reagent, this quantity depending upon the percentage of mercaptans and like sulphur compounds to be converted into non-corrosive constituents.

From mixing chamber 13 the commingled mixture of gasoline stock, caustic soda solution containing activated charcoal, and air, passes under pump pressure through pipe 17 and into settling tank 18, wherein a portion of the reagent settles to the bottom of tank 18. The air which was introduced into the system separates and is withdrawn from the system, passing up into dome 68 and out through pipe 70 to an absorber not shown, wherein the gasoline absorbed by the air may be extracted and returned to tank 38 by pipe connections not shown.

From settling tank 18 the treated gasoline stock and reagent which did not separate in tank 18 passes through pipe 25 and into settling tank 62, wherein a further portion of the reagent settles to the bottom of tank 62. From tank 62 the treated gasoline stock, which may still contain a small proportion of the reagent, passes through pipe 28 into tank 29, wherein the remaining portion of the reagent may settle to the bottom of tank 29. From tank 29 the treated gasoline stock, if completely free from the reagent, passes through pipe 32, controlled by valve 33, and into storage tank 38.

If the treated gasoline stock passing out of tank 29 is not clear and water white, which indicates that all the treating reagent has not been separated, valve 33 is closed and valve 34 in pipe 35 in opened, and the treated gasoline stock which still contains a small percentage of the reagent is caused to pass through filter press 36, which completely removes any of the activated carbon contained in the treated gasoline stock. Filter press 36 is provided with a pan receiver 65 for holding any activated carbon when the same is removed from filter press 36. The activated carbon separated by filter press 36 may be returned to the system for further use until completely spent.

The treated gasoline stock which collects in tank 38 ("sweet" to the "doctor test") may be conducted to a storage not shown through pipe 39 controlled by valve 40, and thereafter marketed as motor gasoline or other purposes.

The reagent which settles in tanks 18, 62 and 29 is continuously withdrawn into pipe 24 by regulated opening of valves 22, 26 and 30, the reagent passing through pipes 23, 27 and 31. Pipe 23 controlled by valve 22, pipe 27 controlled by valve 26, and pipe 31 controlled by valve 30 connect settling tanks 18, 62 and 29 to pipe 24.

The reagent which is continuously withdrawn into pipe 24 continuously passes into the suction side of pump 21, and is discharged by pump 21 through pipe 19, controlled by valve 20, back into pipe 16, and is continuously recycled to treat gasoline stock until spent. During the recycling of the reagent through the treating system to continuously "sweeten" a uniform continuous flow of gasoline stock from tank 3, valves 48 and 51 are closed and the operation of pump 50 is discontinued until the treating reagent circulating in the system in spent; or a continuous small flow of the reagent may be continuously introduced into the treating system, in which case the same quantity would be withdrawn by a regulated opening of valve 41, thereby permitting a portion of the circulating reagent to pass into the suction side of pump 42'. Pump 42' discharges the reagent through pipe 67 and into filter press 43. Pipe 42 connects pipe 24 to the inlet side of pump 42'. Pipe 67 connects the discharge side of pump 42' to filter press 43.

The spent activated carbon and solid impurities are separated from the spent caustic soda solution which may contain extracted fluid impurities by filter press 43. The spent activated carbon is removed from the filter plates of filter press 43 into filter pan 64. This separated spent activated charcoal which collects in filter pan 64 may be revivified by methods known in the art, which may be by roasting or by lixiviation with solvents, and used again for "sweetening" gasoline stock.

The spent caustic soda solution and liquid products pass from filter press 43 through pipe 44 and into a receiving tank 45. From tank 45 the spent caustic soda solution may be conducted to a storage not shown through pipe 46, controlled by valve 47.

The "sweetening" operation may also be conducted without the continuous introduction and continuous removal of the reagent, in which case, after the required quantity of reagent has been introduced into the treating system, the operation of pump 50 is discontinued and valves 52 and 48 are closed, and the reagent is circulated as previously described until spent, after which the spent reagent is removed from the system. In removing the spent reagent from the system, the spent reagent passes through valve 41, pipe 42, pump 42', pipe 67, etc., as previously described.

After the removal of the spent reagent a sufficient quantity of new reagent is introduced and the operation continued.

While the process herein described is well adapted for carrying out the objects of this invention, various modifications and changes may be made without departing from the invention, such as the use of mechanical mixers of any known type, and the invention includes all such modifications and changes as come within the scope of the appended claims.

What I claim is:

1. A process for treating gasoline stock which is positive to the "doctor test" to render the gasoline stock negative to the "doctor test", comprising, commingling gasoline stock which is positive to the "doctor test" with a water solution of an alkali salt having a pH value greater than 7.4 containing comminuted activated charcoal and air, to convert corrosive sulphur hydrocarbons into non-corrosive sulphur hydrocarbons and render the gasoline negative to the "doctor test", and then separating purified gasoline stock from the excess alkali salt solution, products of reaction, activated charcoal and aeriform products.

2. A process for treating gasoline stock derived by cracking higher boiling hydrocarbon oils, comprising, agitating the gasoline stock with a water solution of an alkali salt having a pH value greater than 7.4 containing comminuted activated charcoal which has been emulsified by blowing with air, and then separating treated gasoline stock from the excess alkali salt solution, products of reaction, comminuted activated charcoal, and aeriform products.

3. A process for treating gasoline stocks containing mercaptans in solution to convert the mercaptans into disulphides, comprising, commingling the gasoline stock with a water solution of an alkali salt having a pH value greater than 7.4, activated charcoal and air, the air being introduced in quantities sufficient to oxidize the mercaptans contained in the gasoline stock to disulphides, and then separating treated gasoline stock containing the disulphides in solution from the alkali salt solution, activated charcoal and aeriform products.

4. A process for purifying gasoline stock to render the gasoline stock negative to the "doctor test", comprising, passing a gasoline stock which is positive to the "doctor test" in a regulated stream flow into a mixing device, and continuously mixing the stream of gasoline stock in the mixing device with a regulated stream of a water solution of an alkali salt having a pH value greater than 7.4 containing activated charcoal, and with a regulated stream of air, the air being introduced in quantities sufficient to oxidize and convert the mercaptans contained in the gasoline stock into disulphides, continuously passing the stream of the commingled mixture of gasoline stock, water solution of the alkali salt containing the activated carbon, and the air, through a plurality of settling tanks, and separating the water solution of the alkali salt containing the activated carbon and aeriform products from a purified gasoline stock which is negative to the "doctor test".

5. A process of purifying gasoline stock to render the gasoline stock "sweet" to the "doctor test", comprising, passing a gasoline stock which is "sour" to the "doctor test" in a regulated stream flow into a mixing device, and continuously commingling the stream of gasoline stock in the mixing device with a regulated stream of a water solution of an alkali salt having a pH value greater than 7.4 containing comminuted activated charcoal, and with a regulated stream of air, the air being introduced in quantities sufficient to oxidize and convert corrosive sulphur bearing hydrocarbons contained in the gasoline stock into non-corrosive sulphur bearing hydrocarbons, continuously passing the stream of the commingled mixture of gasoline stock, water solution of the alkali salt containing the activated charcoal, and the air, through a plurality of settling tanks, and separating the water solution of the alkali salt containing the activated carbon and aeriform products from a purified gasoline stock, and continuously returning the separated alkali salt solution containing the activated charcoal to the said mixing device to purify other gasoline stock until spent.

6. An improved method of treating gasoline stock, comprising, treating the gasoline stock with an alkaline water reagent having a pH value greater than 7.4, activated charcoal and air.

7. An improved method for sweetening gasoline stocks, comprising, commingling "sour" gasoline stock with a mixture of an alkaline water reagent having a pH value greater than 7.4, activated charcoal and air, and then separating the reagent, excess air and activated charcoal containing adsorbed impurities from "sweet" gasoline stock.

8. An improved method of treating gasoline stock which is positive to the "doctor test" to render the gasoline stock negative to the "doctor test", comprising, commingling an alkaline water reagent having a pH value greater than 7.4 and activated charcoal with air, separating the excess air from the reagent and activated charcoal, and then treating the gasoline stock with the reagent and activated charcoal.

In testimony whereof I affix my signature.

ARTHUR LACHMAN.